United States Patent
Marmolejo-Meillon et al.

(10) Patent No.: US 9,736,748 B1
(45) Date of Patent: *Aug. 15, 2017

(54) ADVANCED NETWORK CHARACTERIZATION AND MIGRATION

(71) Applicant: iPass Inc., Redwood City, CA (US)

(72) Inventors: Luis G. Marmolejo-Meillon, San Jose, CA (US); Barbara Nelson, San Mateo, CA (US); James M. Underwood, San Mateo, CA (US)

(73) Assignee: iPass Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,785

(22) Filed: Nov. 16, 2015

Related U.S. Application Data

(62) Division of application No. 13/732,226, filed on Dec. 31, 2012, now Pat. No. 9,191,874.

(51) Int. Cl.
*H04W 36/30* (2009.01)
*H04W 36/14* (2009.01)
(Continued)

(52) U.S. Cl.
CPC ............ *H04W 36/30* (2013.01); *H04W 36/14* (2013.01); *H04B 7/216* (2013.01); *H04W 4/00* (2013.01)

(58) Field of Classification Search
None
See application file for complete search history.

(56) References Cited

U.S. PATENT DOCUMENTS

| 5,774,525 A | 6/1998 | Kanevsky et al. |
| 6,609,198 B1 | 8/2003 | Wood et al. |

(Continued)

FOREIGN PATENT DOCUMENTS

| EP | 1241838 | 9/2002 |
| EP | 1562324 | 8/2005 |
| WO | 2007041351 | 4/2007 |

OTHER PUBLICATIONS

International Search Report and Written Opinion issued to International Application No. PCT/US06/38155, Dec. 31, 2007, 9 pages.

(Continued)

*Primary Examiner* — Kodzovi Acolatse

(57) ABSTRACT

In some embodiments, a method includes scanning for wireless networks, where scanning includes collecting network information indicating properties of the wireless networks. The method can include analyzing the network information to determine signal data indicating signal qualities for the wireless networks. The method can include characterizing, based on the signal data, one or more wireless networks as being suitable for connection by the mobile device, where the characterizing includes determining, based on the signal data, movement of the mobile relative to one or more access points of the wireless networks. The method can include determining that one or more signals of the wireless networks are above a dwell threshold level for reliable wireless connectivity. The method can include determining that one or more signals has been dropped, and connecting to the mobile device to one of the one or more wireless networks that are suitable for connection.

1 Claim, 11 Drawing Sheets

(51) Int. Cl.
*H04B 7/216* (2006.01)
*H04W 4/00* (2009.01)

(56) References Cited

U.S. PATENT DOCUMENTS

| | | | |
|---|---|---|---|
| 6,742,048 | B1 | 5/2004 | Walsh |
| 6,892,307 | B1 | 5/2005 | Wood et al. |
| 7,213,048 | B1 | 5/2007 | Parupudi et al. |
| 7,296,288 | B1 | 11/2007 | Hill et al. |
| 7,756,082 | B1 | 7/2010 | Dhamdhere |
| 7,805,414 | B2 | 9/2010 | Duplessis et al. |
| 7,889,663 | B1 | 2/2011 | Wright et al. |
| 9,088,627 | B2 | 7/2015 | Nelson et al. |
| 9,167,053 | B2 | 10/2015 | Marmolejo-Meillon et al. |
| 2002/0029276 | A1 | 3/2002 | Bendinelli et al. |
| 2003/0212909 | A1 | 11/2003 | Chandrashekhar et al. |
| 2004/0063455 | A1* | 4/2004 | Eran ............... H04J 13/0048 |
| | | | 455/525 |
| 2005/0149948 | A1 | 7/2005 | Gupta et al. |
| 2005/0177631 | A1 | 8/2005 | Bahl et al. |
| 2005/0207410 | A1 | 9/2005 | Adhikari et al. |
| 2006/0094400 | A1 | 5/2006 | Beachem et al. |
| 2006/0117104 | A1 | 6/2006 | Taniguchi et al. |
| 2006/0174035 | A1 | 8/2006 | Tufail |
| 2006/0187873 | A1 | 8/2006 | Friday et al. |
| 2006/0230278 | A1 | 10/2006 | Morris |
| 2008/0049702 | A1 | 2/2008 | Meylan et al. |
| 2008/0181179 | A1* | 7/2008 | Karaoguz ......... H04W 36/0066 |
| | | | 370/331 |
| 2008/0254797 | A1* | 10/2008 | Achtari ............ H04W 36/0083 |
| | | | 455/436 |
| 2008/0304458 | A1* | 12/2008 | Aghvami ............. H04W 48/16 |
| | | | 370/338 |
| 2009/0028120 | A1 | 1/2009 | Lee |
| 2011/0053600 | A1* | 3/2011 | Rajasimman ..... H04W 36/0061 |
| | | | 455/442 |
| 2011/0208866 | A1 | 8/2011 | Marmolejo-Meillon et al. |
| 2012/0230304 | A1* | 9/2012 | Barbu .................. H04W 48/18 |
| | | | 370/338 |
| 2013/0109313 | A1 | 5/2013 | Kneckt et al. |
| 2013/0150012 | A1 | 6/2013 | Chhabra et al. |
| 2013/0196621 | A1* | 8/2013 | Guday ................. H04W 24/02 |
| | | | 455/406 |
| 2014/0185469 | A1 | 7/2014 | Marmolejo-Meillon et al. |

OTHER PUBLICATIONS

Karp, David A., "Windows XP Annoyances for Geeks", O'Reilly Media, Inc., 2nd Edition, Chapter, Section 7.5, Nov. 16, 2004, 19 pages.

Supplemental Search Report issued to European Application No. EP06815855, Feb. 4, 2013 , 7 pages.

Zheng et al., "Trusted Computing-Based Security Architecture for 4G Mobile Networks", MSR-Waypoint, Jun. 2005, 5 pgs., http://msrwaypoint.com/en-us/people/yuzheng/trusted_computing-based_security _architecture_for_4g_mobile_netw.pdf.

* cited by examiner

400

| SCAN LIST | | | |
|---|---|---|---|
| SSID | BEACON | $s_i, f_i$ | RSSI |
| $S_1$ | | | |
| ... | | | |
| $S_i$ | | | |
| SN | | | |

| SCAN ANALYSIS TABLE (SA) | | | | | |
|---|---|---|---|---|---|
| FIELD NAME | SA ENTRIES | | | | |
| | 1 | 2 | i | ... | N |
| SSID | | | | | |
| BSSID | | | | | |
| RSSIARR | | | | | |
| WARR | | | | | |
| GARR | | | | | |
| BTE | | | | | |
| ATFARR | | | | | |
| AVARR | | | | | |
| BRARR | | | | | |

| NETWORK CHARACTERIZATION ENTRY TABLE | | | | | |
|---|---|---|---|---|---|
| | NWCES | | | | |
| | 1 | 2 | i | ... | M |
| SSID | | | | | |
| BSSID | | | | | |
| ADF | | | | | |
| DF | | | | | |
| ROF | | | | | |
| RIF | | | | | |
| HO-GRADE | | | | | |
| HO-SCORE | | | | | |

FIG. 6

ADVANCED NETWORK CHARACTERIZATION AND MIGRATION

CROSS REFERENCE TO RELATED APPLICATIONS

This application is a divisional of U.S. patent application Ser. No. 13/732,226 filed on Dec. 31, 2012, the contents of which are incorporated herein by reference

BACKGROUND

Many telecommunication providers offer voice and data service to mobile phone customers. As the internet becomes more popular, mobile phone users are spending more time utilizing data services to access the internet. Data service usage consumes network bandwidth, sometimes causing reduced voice service quality. To meet demands, telecommunication providers are continuously working to expand capacity. Therefore, there is a need for technologies that provide data service to mobile phone customers.

BRIEF DESCRIPTION OF THE DRAWINGS

The present embodiments may be better understood, and numerous objects, features, and advantages made apparent to those skilled in the art by referencing the accompanying drawings.

FIG. 4 shows a table including network information resulting from network scanning, according to some embodiments of the inventive subject matter.

FIG. 5 illustrates a table of scan analysis entries, according to some embodiments of the inventive subject matter.

FIG. 6 shows a table of network characterization entries.

DESCRIPTION OF EMBODIMENT(S)

The description that follows includes exemplary systems, methods, techniques, instruction sequences and computer program products that embody techniques of the present inventive subject matter. However, some embodiments may be practiced without these specific details. In some instances, well-known instruction instances, protocols, structures and techniques have not been omitted for clarity.

INTRODUCTION

Some embodiments of the inventive subjection matter enable mobile devices to automatically switch between cell phone networks and local WiFi networks. As users seamlessly migrate to and from local WiFi networks for data service, cell phone networks have more bandwidth to provide high-quality voice service. In some embodiments, mobile devices include connection managers that scan for WiFi networks, and determine whether the mobile devices can switch to particular WiFi networks. If conditions are amenable for network switching, the connection managers seamlessly connect to WiFi networks, enabling users to have continued data service without consuming mobile phone network bandwidth.

Mobile devices often have different hardware and different operating systems. Different hardware operating systems allow application programs to access different network data. Some embodiments are platform-independent. That is, they can detect networks and perform other operations even though operating systems restrict access to certain network information. As a result, some embodiments do not rely on specific network data that may not be available on some mobile device platforms. These and other embodiments are described in greater detail below.

Figure 1:
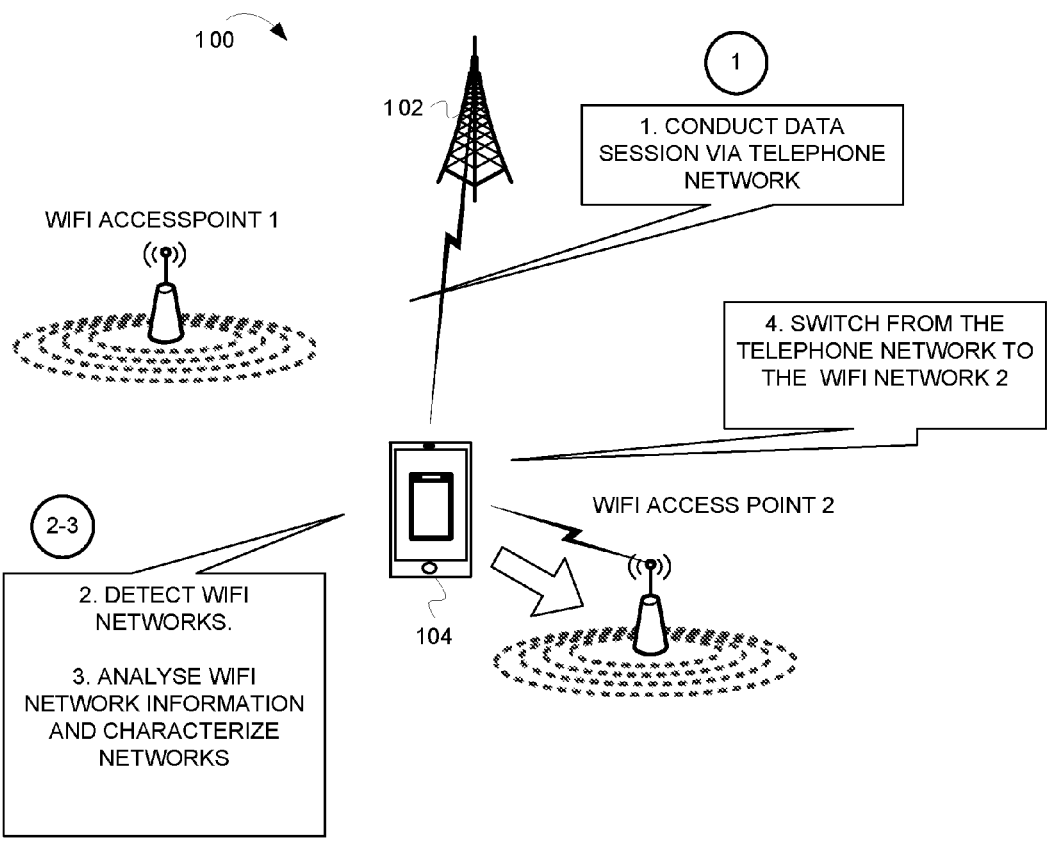
FIG. 1 is a block diagram illustrating network appliances and remote services, according to some embodiments of the inventive subject matter.

FIG. 1 shows how some embodiments operate. FIG. 1 is a diagram illustrating a mobile device migrating from a cell phone network to a WiFi network. The mobile device can seamlessly migrate between networks without user input, and without the user perceiving the migration. FIG. 1 shows a mobile device 104 wirelessly connected to a cell phone network 102. The mobile device 104 is utilizing the cell phone network's data service. To reduce load on the cell phone network 102, the mobile device 104 will connect to a WiFi network for data service. FIG. 1 shows four stages of operation for the mobile device 104.

During stage one, the mobile device 104 is utilizing the cell phone network's data service. During stage two, the mobile device 102 detects WiFi networks to which it may connect (WiFi access point 1 and WiFi access point 2). During stage three, the mobile device 102 analyzes network data (detected during stage two) to determine whether it can connect to any of the WiFi networks. In some instances, the mobile device determines whether signal strength and other factors are favorable for a good connection. For example, in FIG. 1, the mobile device 102 determines that WiFi access point 2 has good signal strength, whereas WiFi access point 1 has poor signal strength (e.g., because the mobile device 102 is closer to the WiFi access point 2). During stage four, the mobile device 102 connects to WiFi access point 2 and utilizes the WiFi network for data services.

By analyzing the networks, the connection manager can identify networks that will provide good connectivity. Hence, embodiments of the inventive subject matter can avoid overhead associated with attempting to connect to unreliable networks (e.g., networks with low signal strength, etc.). Further, embodiments can connect to alternative networks for data service, thereby reducing loads on cell phone networks These and other embodiments are described in more detail below.

Architecture

Figure 2:
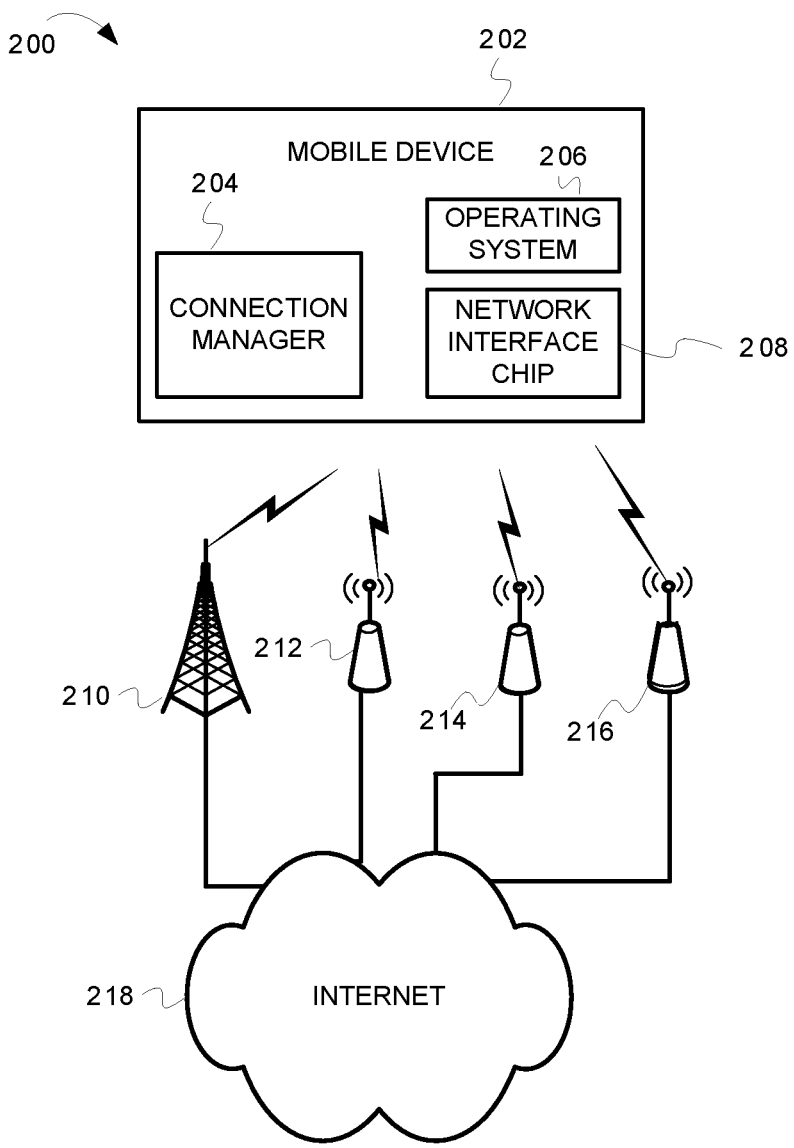
FIG. 2 is a block diagram illustrating an architecture for some embodiments of the inventive subject matter.

FIG. 2 is a block diagram illustrating an architecture for some embodiments of the inventive subject matter. In FIG.

2, the architecture 200 includes a mobile device 202, cell phone tower 210, and wireless access points 212, 214, and 216. The cell phone tower 210 provides wireless connectivity to a cell phone network which is connected to the internet 218. The wireless access points (212, 214, 216) provide connectivity to local area networks, which are connected to the internet 218 (e.g., via DSL, cable connection, etc.).

The mobile device 202 can utilize the cell phone network for voice and data service. As shown, the mobile device 202 includes a network interface module 208 that can connect to wireless networks including cell phone networks (e.g., via the tower 210), WiFi networks (e.g., via wireless access points 212, 214, & 216), Bluetooth networks, etc. The connection interface module 208 can conduct communications according to any suitable networking protocol (e.g., WiFi, cell phone network protocols, etc.). To facilitate wireless communications, the network interface module 208 can scan for networks, connect to networks, and exchange data over networks.

The mobile device 202 also includes an operating system 206 that facilitates control of the network interface module 208, and other components of the mobile device 202 (not shown). The operating system 206 can query the network interface module 208 for information about networks detected by the network interface module. More details about the network information will be given below.

The mobile device 202 also includes a connection manager 204. The connection manager 204 can perform operations for switching between wireless networks. For example, if the mobile device 202 is utilizing data services from a cell phone network, the connection manager 202 can utilize the network interface module 208 to scan for wireless networks from which data services are available. In some embodiments, the connection manager 204 interacts with the operating system 206 to procure network information collected by the network interface module 208. The connection manager 204 can analyze data collected by the module 208. Based on the analysis, the connection manager 204 can select a wireless network, and connect to the selected network. Moving between networks can reduce loads on cell phone networks, improve connection speeds (e.g., by connecting to networks having stronger signals), reduce data fees (e.g., by moving to free wireless networks), etc.

Operations

This section describes operations for switching between networks. For some embodiments, the operations can be divided into the following: network scanning, network data analysis, network characterization, and network switching. The following discussion describes these operations, and data structures resulting from or otherwise used in association with these operations.

Network Scanning

According to some embodiments, network scanning is a process by which the mobile device detects wireless networks. Wireless access points periodically transmit beacons that include information about their wireless networks. By scanning, mobile devices discover information about wireless networks that may be available for use.

Embodiments of the inventive subject matter can use one or more of the scanning techniques described below. For some embodiments, the connection manager can use one or more scanning techniques to detect wireless networks.

Despite a variety in scanning techniques, the connection manager can create a table including network data gleaned from scanning operations. The table's network data may be used during network data analysis operations. Furthermore, these scanning operations abstract the scanning process and provide a basis for platform-independent network characterization. The following discussion describes various network scanning techniques employed by some embodiments.

Each of the following network scanning techniques will determine Received Signal Strength Indicators (RSSI) and Link Rate Scores (LRS). The RSSI and LRS values do not represent a physically measured quantity, but instead is a numerical calculation as follows:

If RSSI<MaxRSSI then RSSS=RSSI

If RSSI=MaxRSSI then RSSS=RSSI+LRS

RSSI=Received signal strength indicator in (e.g., in DBm)

LRS=Link Rate Score=3*$\log_2$ (Link Rate in Mb/s)

LRS is proportional to the 3 db increase in power needed to double the bit rate.

From above, RSSI is received from the wireless access point (e.g., RSSI is included in a WiFi beacon received from a WiFi access point), MaxRSSI may be known or received from the access point. The other variables may be determined by the connection manager.

In some embodiments, the connection manager performs N cycles of physical network scanning on the network interface module, and splits scanning results into M groups based on non-overlapping scan intervals.

The following scanning techniques are described below: interval-based (non-overlapping) scanning, interval-based (overlapping) scanning, message-based scanning, and fast scanning.

Interval-Based, Non-Overlapping

In some embodiments, interval-based scanning can be asynchronous or synchronous. The scan intervals can be regular or irregular. The following variables are defined for interval-based (non-overlapping) network scanning:

N=Total Scan Intervals

T=Elapsed time=$f_n - s_1$ $S_i$=Scan Results for Interval {i}

$L_i$=Length of Scan Interval {i}. When regular intervals are used the all $L_i$ have the same values.

$G_i$=Scan Gap {i}=$s_i - f_{i-1}$. With non-overlapping scanning, this gap can typically be made small but not zero. As a reference, some embodiments keep $$\frac{\sum Gi}{T} \leq 5\%.$$

Before performing interval-based scanning, the connection manager determines the following input parameters:

N=Number of Scan Intervals

MST=Minimum Signal Threshold

Figure 3A:
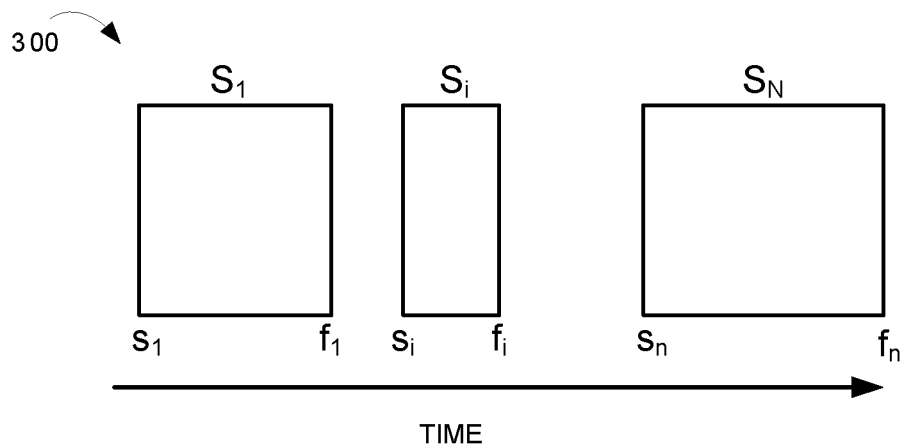
FIG. 3A is a diagram illustrating network work scan intervals, according to some embodiments.

After determining the number of scan intervals (N), and minimum signal threshold (MST), the connection manager performs N scans {S1 . . . SN}. The connection manager performs N scans with assistance from the network interface module and operating system. If the scan intervals do not overlap, the output of this stage is {S1 . . . SN}. FIG. 3A is a diagram illustrating network work scan intervals, according to some embodiments. In FIG. 3A, a graph 300 shows non-overlapping scan intervals S1, Si, and SN. Scan interval S1 starts at s1 and finishes at f1. Scan interval Si starts at si and finishes at fi. Scan interval SN starts at sn and finishes at fn.

Figure 4:
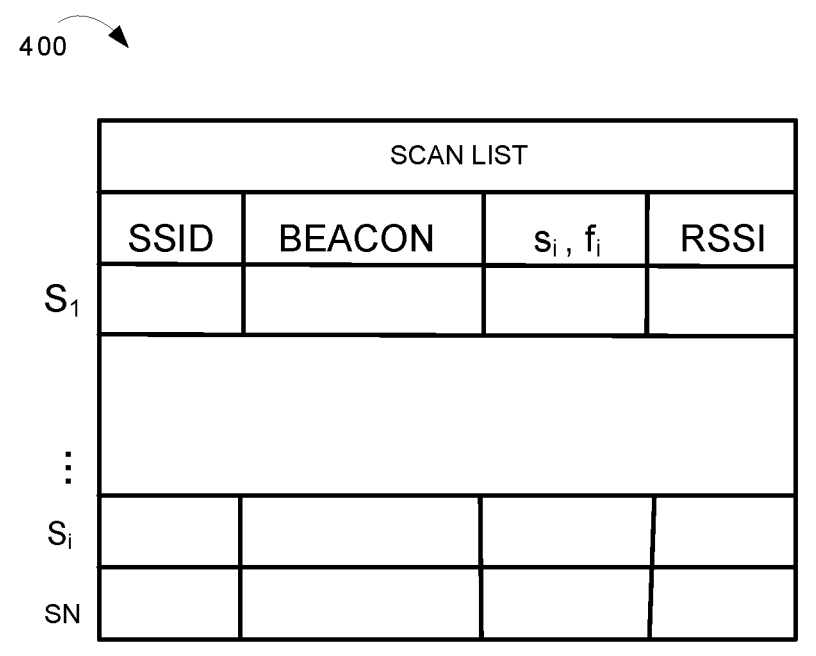

After performing N scan intervals, the connection manager generates a table of network information detected during the network scanning FIG. 4 shows a table including network information resulting from network scanning, according to some embodiments of the inventive subject matter. In FIG. 4, a table 400 includes fields for service set identifier (SSID), beacon frame (beacon), start and finish times for the interval (si,fi), and Received Signal Strength Indicator (RSSI). WiFi networks periodically transmit beacon frames to announce the presence of wireless networks. Beacon frames can include the following information:

MAC header

Timestamp

Beacon interval—This is the time interval between beacon transmissions. The time at which a node (e.g., an access point) must send a beacon is known as Target Beacon Transmission Time (TBTT).

Capability information—Capability information field spans to 16 bits and contain information about capability of the access point/network. Network type, such as AdHoc or Infrastructure network, is signaled in this field. This field also announces the support for polling, and details about encryption support.

SSID

Supported rates

Frequency-hopping (FH) Parameter Set

Direct-Sequence (DS) Parameter Set

Contention-Free (CF) Parameter Set

IBSS Parameter Set

Traffic indication map (TIM)

Because a network's beacon frames can include the information shown above, table 400's beacon field can include such information.

In FIG. 4, the table 400 is populated with network data resulting from network scanning. As noted above, some embodiments of the connection manager create table 400 regardless of the scanning technique. The following subsections will describe other scanning techniques.

Interval-Based, Overlapping

Figure 3B:
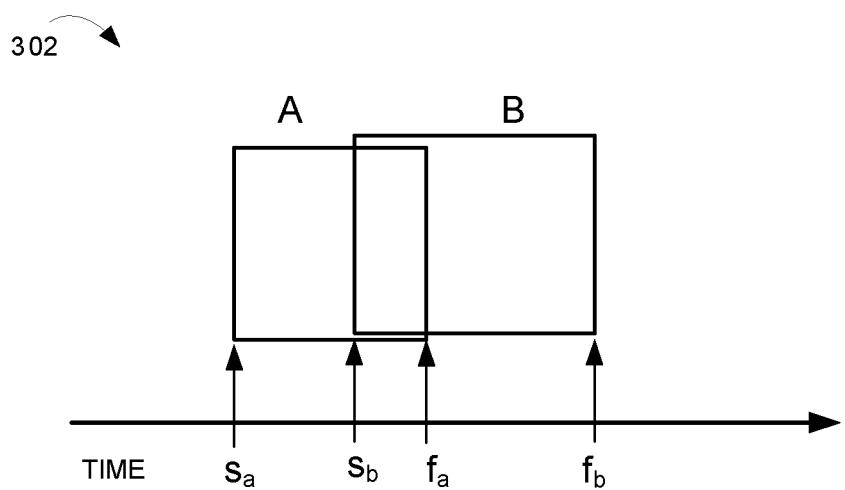
FIG. 3B is a diagram illustrating overlapping scan intervals.

Interval-based scanning is similar to the scanning described above, but where scanning intervals overlap. By allowing overlapping intervals, this model achieves greater accuracy by covering gaps between scan intervals that might occur when intervals do not overlap. FIG. 3B is a diagram illustrating overlapping scan intervals. As shown, a graph 302 includes scan intervals A and B. Scan interval A starts at sa and finishes at fa. Scan interval B starts at sb and finishes at fb. As shown, these intervals overlap between sb and fa.

When performing this scanning technique, the connection manager performs the following:

The connection manager performs N cycles of physical network scanning on the network interface module.

The connection manager splits the set of N scanning results into a set of M scanning results based on M non-overlapping scan intervals. The connection manager can compare pairs of intervals. Larger intervals are compared first. Intervals fully contained in another, can be removed. Intervals with no overlap are not removed. Intervals that overlap are split, so that the larger of the two remains intact, while the smaller interval is modified such that the only SSIDs retained are those not included in the other (A'=A−B), and then interval endpoints are adjusted.

The following variables are defined for interval-based (non-overlapping) network scanning:

N=Total Scan Intervals

T=Total Elapsed time (wall clock)=$s_n-f_1$ $S_i$=Scan Results for Interval $\{i\}$ $L_i$=Length of Scan Interval $\{i\}$. For regular intervals $L_i=L_j$ $L_{A,B}$=Overlap between intervals A and B, determined as follows:

Overlap<A,B>=iff Not $(f_b<s_a$ or $f_a<$

If Overlap<A,B> then $L_{A,B}=\max(s_a,s_b)-\min(f_a,f_b)$;
Otherwise $L_{A,B}=0$;

$\text{Overlap}_A\{B\}$=% Overlap of A, B relative to A=$L_{A,B}/L_A$ $\text{Overlap}_B\{A\}$=% Overlap of A, B relative to B=$L_{A,B}/L_B$ Contains $\{A,B\}$=True if Interval B is fully contained (i.e. $L_{A,B}$=0) L in Interval A.

Before performing interval-based scanning, the connection manager determines the following inputs parameters (e.g., based on configuration information, user input, etc.):

N=Number of Scan Intervals

MSIO=Maximum Scan Interval Overlap (%)

In some embodiments, the connection manager performs the following operations when conducting interval-based network scanning, where intervals overlap.

1 Performs N scans $\{S_1 \ldots S_N\}$

2 Mark all Scan Intervals as Pending

3 Runs in a loop until no Scan Intervals are Pending 3.1 Sort (descending) the List of Pending Intervals by size ($L_i$)

3.2 Pick the $1^{st}$ (largest $L_i$). This is A 3.3 Iterate through the rest of Pending Intervals. This is B 3.3.1 If Contains $\{A,B\}$ then Remove $S_B$ from Pending List 3.3.2 If Overlap<A,B> then 3.3.2.1 If % overlap between A, B (or B and A) is >MSIO then flag it with a warning.

3.3.2.2 Calculate T as the set of SSIDs in $S_B$ that are not in $S_A$ 3.3.2.3 Remove from $S_B$ all the entries for SSIDs not in T.

3.3.2.4 Adjust $S_B$ interval boundaries $s_b=\max(s_a,s_b)$ $f_b=\min(f_a,f_b)$ 3.3.2.5 Mark $S_B$ as not pending 4 Result is the final list Message-Based Scanning With message-based scanning, the mobile device's hardware/OS platform allows the connection manager to access the actual radio beacons transmitted by the APs. The result of this scan could be made available piecemeal (i.e. one at a time) or on a periodic basis. Using the scanning models noted above, the connection manager can perform message-based scanning as follows:

a) A Beacon message is treated as a Scan Interval $S_i$ for the purposes of preparing the output structure (e.g., table 400) for later stages of processing (e.g., for network data analysis, etc.).

b) Beacon Time Estimate is directly obtained from the beacons (no need to estimate).

Fast Scanning

Fast scanning uses channel multiplexing to speed-up the scanning process. Depending on available hardware features on the mobile device, channel multiplexing can bring an order of magnitude (10×) improvement. Furthermore, this method relates to the interval based methods mentioned earlier, and provides additional performance gains. The 10× factor improvement comes from the number of channels specified in the 802.11 standard (which is between 11 (USA) and 14 (Japan) depending on the country/region), and can be obtained in the following situations: 1) Simultaneous channel scanning during full scans (N Channels scanned in the same time it takes to scan only one of them), or 2) Specific channel scanning as is the case with pre-configured network directories, or connection manager caching which allows the scanning of 1 channel in ¹/₁₁th of the time it would take to do a typical full sequential scan (¹/₁₄th in Japan).

Parallel multi-channel scanning can be performed with a single network interface module capable of multi-channel scanning or with multiple network interface modules attached to the same end-point and each performing a different channel scan.

For Single Channel Scanning, this methodology determines the channel's scan priority based on the provisioned, recent or cached knowledge about the network. The methodology is based on the use of elapsed time and change of location as the basis for performing a neighborhood based (local) discovery before engaging in a full network discovery (global) as follows:

1 Use information for last cached session if elapsed time is within a configured elapsed window. Channel of the last cached session gets the highest priority.
2 Use the entire cache of known/scanned networks if location has changed but still within a max distance. This corresponds for searching on a wider area but still within the local neighborhood. The channels with the highest priority are those on which neighboring APs would be transmitting and this in turns is protocol and band specific. (See table below). Channel prioritization is as follows:
2.1 Scan channels not overlapping with that of the last cached session
2.2 Scan channels on the list of cached local networks
2.3 Scan channels that don't overlap with any of the networks in 2.2
3 If geo-location is available search the session history cache for BSSIDs within a maximum range distance $r_1$. For each network in the result set ($R_S$), perform channel scanning in the following order (with early stop):
3.1 Scan channels for SSIDs in $R_S$. If none found continue.
3.2 Scan channels that don't overlap those in 3.1
4 Otherwise perform a full scan Channel overlap on the 2.4 Ghz band, is determined via the following table lookup:

| Protocol | Non-Overlapping Channels | | | | |
|---|---|---|---|---|---|
| 802.11b | 1, 6, 11, 14 | 2, 7, 12 | 3, 8 | 4, 9 | 5, 10 |
| 80211g/n | 1, 5, 9, 13 | 2, 6, 10 | 3, 7, 11 | 4, 8, 12 | 3, 11 |
| 80211n | 3, 11 | | | | |

Channels are prioritized based on the likelihood of finding eligible transmitting networks and whether they have been scanned recently. For example, if the last session was established on a SSID transmitting on Channel 1, the connection manager would scan channels in the following order:
a) Channel 1
b) Channels 6, 11, 14
c) Channels in list of cached networks—excluding 1, 6, 11, 14 (scanned so far)
d) Channels not overlapping with list of cached networks (SSID By SSID)—excluding all channels scanned so far
e) Find Channels for SSIDs in session history cache within a distance (n) of current geo-location
f) Perform a full scan on the remaining channels.

If simultaneous scanning is possible with the available hardware on the mobile, then each list above can be started at the same time. Thus, scanning the channels appearing higher in the list (above) may complete sooner because it is more likely networks will be transmitting in those channels.

This is the scanning methodology referenced in the Network Discovery Diagram in this application.

Network Scan Analysis

After performing network scanning operations, the mobile device can analyze network data acquired by the network scanning. The connection manager can begin with a table of network information (e.g., table 400), and create another table that will be used in characterizing networks and determining whether to switch between networks. By performing network scan analysis and network characterization (described below), the connection manager can identify networks that will provide good connectivity. After selecting a target network, the connection manager can connect to it. Because the network manager does scan analysis and network characterization, it can avoid computation overhead associated with attempting to connect to unreliable networks (e.g., networks with low signal strength, etc.).

Before the network data analysis, the connection manager determines the following input parameters:
MST=Minimum Signal Threshold
List of Scan Results={Si} one entry for each Scan Interval 1 . . . N.

As a result of the network data analysis, the connection manager produces a scan analysis table including scan analysis entries, where $\{SA_{ENTRY}\}=\{SA_j\}$. There is one SA-Entry per unique SSID in {S1 U Si . . . U SN} and each SA-Entry may be formatted as shown in table 500, shown in FIG. 5. In the table 500, the $SA_{ENTRY}$ includes the following fields: SSID, BSSID, RSSIArr, wArr, gArr, BTE, atfArr, avArr, and brArr. Although SSID and BSSID are received from the access point, in some embodiments, the other variables are determined by the connection manager. The table in FIG. 5 shows a single SA-Entry, and defines how some embodiments determine values for the SA-Entry variables. If a plurality of unique SSIDs appear in the scan analysis data, the table 500 will include an SA-Entry (as shown) for each SSID. The table directly below explains variables appearing in each SA-Entry in the Scan Analysis table 500.

| Field | Meaning | Description | Values (default) |
|---|---|---|---|
| SSID | SSID | | |
| BSSID | BSSID | | |
| RSSIArr | Received Signal Strength Array | Array of size N, with position $_i$ referring to Scan Interval $S_i$. Each cell refers to the RSSI (e.g., in dbM) as detected during the scan step. | 0-100 |
| wArr | Scan Interval Width Array | Array of size N. Position (i) indicates Width of Interval $S_i$. | |
| gArr | Scan Interval Gap Array | Array of size N. Position(i) indicates Gap between Interval $S_i$ and $S_{i-1}$. | |

-continued

| Field | Meaning | Description | Values (default) |
|---|---|---|---|
| BTE | Beacon Time Estimate | This is an upper bound estimate on the Beacon Time Interval, and needs to be estimated if not available or reported by the OS API. Initial value is MAX_NUMERIC. | |
| atfArr | Above Threshold Flag Array | Array of size N, with position $i$ referring to Scan Interval $S_i$ Cell values and their meaning are: 1: RSSI >= MST for this Scan Interval 0 (default): RSSI < MST for this Scan Interval | {0, 1} |
| avArr | SSID Available Array | Array of size N, with position $i$ referring to Scan Interval $S_i$ Cell values and their meaning are: 0: SSID is missing from this Scan Interval 1: SSID is available in this Scan Interval U (default): SSID is not known whether missing beacon or AP is unavailable. | {0, 1, U} |
| brArr | Bit Rate Array | Array of size N, with position $i$ referring to Scan Interval $S_i$ Each cell holds the value of the bit rate in Mbps as determined by the Scanning Step. | Integer |

In some embodiments, the connection manager performs the following operations to populate the scan analysis table.
1 Allocate and initialize result list (SA) as follows
1.1 Determine $N_{ssid}$=Number of Unique SSIDs in $S_1 \cup S_2 \cup \ldots \cup S_N$
1.2 Allocate one $SA_{ENTRY}$ for each of the $N_{SSID}$ Unique SSIDs
1.2.1 Allocate each Array field within $SA_{ENTRY}$ with a size of N (one cell for each interval)
1.2.2 Iterate through each scan interval $S_i$ and through each SSID
1.2.2.1 Find $SA_{ENTRY}$ in (SA) corresponding to the $SSID_i$ from $S_i$
1.2.2.2 Initialize
1.2.2.2.1 $SSID_{SA}$=$SSID_i$
1.2.2.2.2 $BSSID_{SA}$=$BSSID_i$
1.2.2.2.3 $RSSIArr_{SA}<i>$=$RSSI_i$
1.2.2.2.4 $brArr_{SA}<i>$=Max Available $BitRate_i$
1.2.2.2.5 $wArr_{SA}<i>$=$f_i$-$s_i$
1.2.2.2.6 $gArr_{SA}<i>$=$s_{i+1}$-$f_i$ for i>1;
1.2.2.2.7 $avArr_{SA}<i>$=1
1.2.3 Iterate through each $SA_k$ in (SA)
1.2.3.1 Set $BTE_k$ to Max (Number of consecutive 1's in avArr)
1.2.3.2 Set atfArr{i} to 1 if $RSSI_i$<MST
1.2.3.3 Set avArr{i} to 0 if all the following conditions are met
  i. avArr{i}=U
  ii. there is an index j<i such that avArr{j} is 1
  iii. BTE<(i−j)
1.2.3.4 Return result list (SA)

In the operations shown above, operations 1.2.2 to 1.2.2.2.7 populate SA-Entries with data collected during network scanning. For example, the operation $RSSIArr_{SA}<i>$=$RSSI_i$ (1.2.2.2.2) populates the SA-Entry with the RSSI value collected during that scan interval. These operations do not modify the scan data. In contrast, the operations 1.2.3.1 to 1.2.3.3 are based on calculations involving the data stored in the SA-Entry. For example, Set $BTE_k$ to Max (Number of consecutive 1's in avArr) (operation 1.2.3.1) involves calculations performed on data stored in the SA-Entry (the data was stored by operations 1.2.2 to 1.2.2.2.7). After performing the calculations 1.2.3.3, the operations return the SA table for further processing, as described below.

In some embodiments, the connection manager has access to beacons that were received from wireless access points. Such embodiments can process perform scan analysis operations different from those described above. The following section describes an alternative technique for network scan analysis.

Scan Analysis Variation for Actual Computations Involving Beacons

The following are variables used in this variation of scan analysis:
NSS: Network's Signal Stability
BIT: Beacon Interval
BTI: Beacon Timestamp
BCount: Beacon Count This variation of the scan analysis takes the following inputs:
SP: Scan Period determines how long the UE listens and collects beacons
WSST: Weak Signal Strength Threshold (e.g., in DBm).
SSST: Strong Signal Strength Threshold (e.g., in DBm).
SST: Signal Stability Threshold For this variation of scan analysis, some embodiments the connection manager performs the following operations.
1.1 Connection manager can update the SSID characterization information at the end of the Scan Period or with each beacon received.
1.1.1 If the BSS (Beacon Signal Strength)>WSST then NSS for that SSID is incremented by one.
1.1.2 If the BSS (Beacon Signal Strength)<WSST then NSS for that SSID is decremented by one.
1.2 At the end of SP, determines if there were beacons missing for that SSID. It does so by comparing the count of beacons received with the expected beacons:
1.2.1 Adjustment=ABS(((max(BTI)−min(BTI))/BIT− BCount);
1.2.2 This adjustment is subtracted to the NSS
1.2.3 Then the SST is applied to the NSS values so obtained. SSIDs with an NSS<SST are excluded from the resulting list.
1.3 Method Variations
1.3.1 Ignore Missing Beacons: NSS is not adjusted with the missing beacons (step 1.3.2)
1.3.2 No Missing Beacons tolerated: This step marks the SSID as excluded. The algorithm will ignore adjustments or not. It will be excluded from the final list.
1.4 Additive-Weight Beacons:
1.4.1 UE determines the weight to use for each beacon (Wn) in the SP. With # of weights n=SP/BI.
1.4.2 NSS is incremented by a weight Wn
1.4.3 NSS is decremented by a weight Wn
1.5 Multiplicative-Weight Beacons:
1.5.1 Each weight is between [0,1] and the Sum of all weights=1;
1.5.2 UE determines the weight to use for each beacon (Wn) in the SP. With # of weights n=P/BI.
1.5.3 NSS is incremented by weight Wn
1.5.4 NSS is decremented by weight Wn Network Characterization After performing scanning and scan analysis, some embodiments of the connection manager perform network characterization. Network characterization can include determining, based on the scan analysis, which networks can support reliable connections. This determination may consider signal strength factors, such as signal quality and whether the mobile device is moving closer to or away from particular access points.

In some embodiments, the connection manager uses results from the scan analysis (e.g., table 500) to characterize the networks. In a nutshell, some embodiments characterize each SSID/BSSID in terms of signal strength and signal stability by evaluating the scan analysis data.

The connection manager can iterate through all SSIDs in the scan analysis table, and create a new table of network connection entries (NWCE) for each SSID. The connection manager can aggregate one or more scan intervals (Si) along one or more data fields in the scan analysis table. Aggregation could be performed in one of multiple ways including:

- Bitwise or linear combinations of product quantities. This is shown in as a Dot Product.
- Sequence Matching. Where a target vector is matched against an expected vector for matches. The expected vector includes the "*" as a wildcard character indicating that the value of the target vector at that position is not relevant (i.e. can be excluded) from the matching.
- Statistical. Based on average, mean, or mode values; and ranges expressed as standard deviations.

At the end, the metrics characterizing each of the input SSIDs can be utilized as follows:

- Drop Flag (DF) and Above Dwell Threshold Flag (ADF)—Enable 2nd level SSID filtering for policy enforcement or connection management's usability and performance features. For example: auto Connect described later in this document.
- Roam Out Flag (ROF) and Roam In Flag (RIF)—Provide a metric of signal stability in the presence of mobility or fluctuating channel conditions. RIF can indicate that a mobile device is moving closer to an access point, whereas ROF can indication that a mobile device is moving away from an access point.
- Hand Off Grade (HO-Grade)—HO-Grade can indicate whether a network is a good candidate for connection by the mobile device. HO-Grade is incorporated into the Network Ranking Model (described below) to set discovery priority based on classes of signal robustness.
- Received Signal Score (RSSS)—RSSS is described above. RSSS is incorporated into the Network Ranking Model to set discovery priority based on signal score that takes into account both signal power and bit rate.

Some embodiments of the connection manager take the following inputs when performing network characterization: List of Scan Analysis Results={SAj} from Scan Analysis Step.

The connection manager can produce the following data as a result of network characterization: List of Network Characterization Entries={NWCE}, where NWCE=<SSID, BSSID, ADF, DF, ROF, RIF, HO-Grade, HO-Score>

FIG. 6 shows a table of network characterization entries. The following table describes these variables is more detail:

| Field | Meaning | Description | Values (default) |
|---|---|---|---|
| SSID | SSID | | |
| BSSID | BSSID | | |
| ADF | Above Dwell Threshold Flag | SSID is above the Dwell Threshold Level | True/False |
| DF | Drop Flag | SSID signal dropped | True/False |
| ROF | Roaming Out Flag | SSID is moving away from AP | True/False |
| RIF | Roaming In Flag | SSID is moving closer to AP | True/False |
| HO-Grade | Hand Off Grade | Indicates SSID suitability category for Hand-Off: 0 = Unstable 1 = Falling Out. Short lived sessions expected 2 = Falling In. Short lived sessions expected 3 = Stable. Longer-lived sessions expected | 0-3 |
| RSSS | Received Signal Score | Measures Network's signal quality using 2 factors: Signal Strength and bit rate as an absolute measure that is a function of both the receiver and the transmitter. | 0-255* |

*It's max value depends on maximum bit-rate as determined by capabilities of the transmitter/receiver pair and environment conditions (noise, distance). Current Max value @ 22 Mbps is 105.

In some embodiments, the connection manager performs the following operations to populate the scan analysis table.

1    Set NWC to empty list
2    For each $SA_{entry}$ ($SA_i$) in SA do
2.1    Add $NWC_{entry}$ to NWC carrying forward the fields SSID, BSSID
2.2    Set ADF to true if Sum( (avArr(j) x (atfArr(j)) ) > 0
     Note: (u)(1) = 0; and (u)(0) = 0;
2.3    Set DF to true if Sum( (avArr(j) x (NOT(atfArr(j)) ) > 0
     Note: (u)(1) = 0; and (u)(0) = 0;
2.4    Set ROF to true if there is at least $\%L_1$ of available intervals for that SSID (avArr{j} = 1) have a RSSS consistently equal or lesser than the previous interval. More specifically:
     tCount = 0;
     minIntervals = 0;
     prvJ = 0;
     For j = 1 to N {
       If avArr{j}is true {
         minIntervals++;
         If RSSS {j} < RSSS{prvJ} {
           tCount++;
         } else {
           tCount = 0;
         }

```
            prvJ = j;
         }
      }
   minIntervals = minIntervals * L1/100;
   ROF = (tCount > minIntervals) ? true : false;
2.5 Set RIF to true if there is at least % L₁ of available intervals for that SSID (avArr{j} < >
    U) have a RSSS consistently equal or greater than the previous interval. In other
    words:
       tCount = 0;
       minIntervals = 0;
       prvJ = 0;
       For j = 1 to N {
          If avArr{j} < > U {
             minIntervals++;
              If RSSS {j} > RSSS {prvJ} {
             tCount++;
          } else {
          tCount = 0;
          }
          prvJ = j;
       }
    }
    minIntervals = minIntervals * L1/100;
    RIF = (tCount > minIntervals) ? true : false;
2.6 Set HO-Grade as follows:
```

| DF | ADF | ROF | RIF | HO-Grade |
|----|-----|-----|-----|----------|
| *  | F   | *   | *   | 0        |
| T  | *   | *   | *   | 0        |
| F  | T   | T   | T   | 0        |
| F  | T   | T   | F   | 1        |
| F  | T   | F   | T   | 2        |
| F  | T   | F   | F   | 3        |

```
2.7 Set RSSS as follows
    If RSSI < MaxRSSI then RSSS = RSSI
    If RSSI = MaxRSSI then RSSS = RSSI + LRS
    Where LRS = 3 * Log₂ (Link Rate in Mb/s) ;
    LRS is proportional to the 3 db increase in power needed to double the bit rate
3   Return NWC
```

Note: RSSS is a measure that for practical purposes is hardware and OS independent thus can be used to specify Connectivity Policy.

After completing network characterization, the connection manager can rank the networks. In some embodiments, the ranking can be based on the ADF, DF, ROF, RIF, HO-Grade, and RSSS. Embodiments can make the ranking metrics and characterization data available to policy administrators for use in creating and selecting policies for network selection. In some embodiments, the policies affect how the connection manager selects networks. That is, connection managers can carry out network selection policies created by administrators. The following section describes hand off policies, which govern whether the mobile device will connect to an available wireless network.

Network Switching and Session Hand-Off

Session hand-off relates to automatically switching a user's internet session from a first session on a first network to second session on a second network. The first session is typically costlier than the second session. For example, data transfer costs per megabyte are higher on the first network, and lower on the second network. Hand-off policies can be based on {date-time, location scope <lat,long>, Network Provider <1st,2nd>, media type <1st,2nd>} and operations for evaluating the policy and the network environment. Embodiments support switching between any two wireless network access media types. Also, embodiments can be generalized to operate for multi-way session hand-offs.

For some embodiments, the most time consuming factor in performing a session hand-off between wireless networks are the network scanning and discovery operations. Therefore, some embodiments use efficient scanning techniques and caching of network information. These embodiments avoid scanning when they can rely on cached information.

Figure 7:
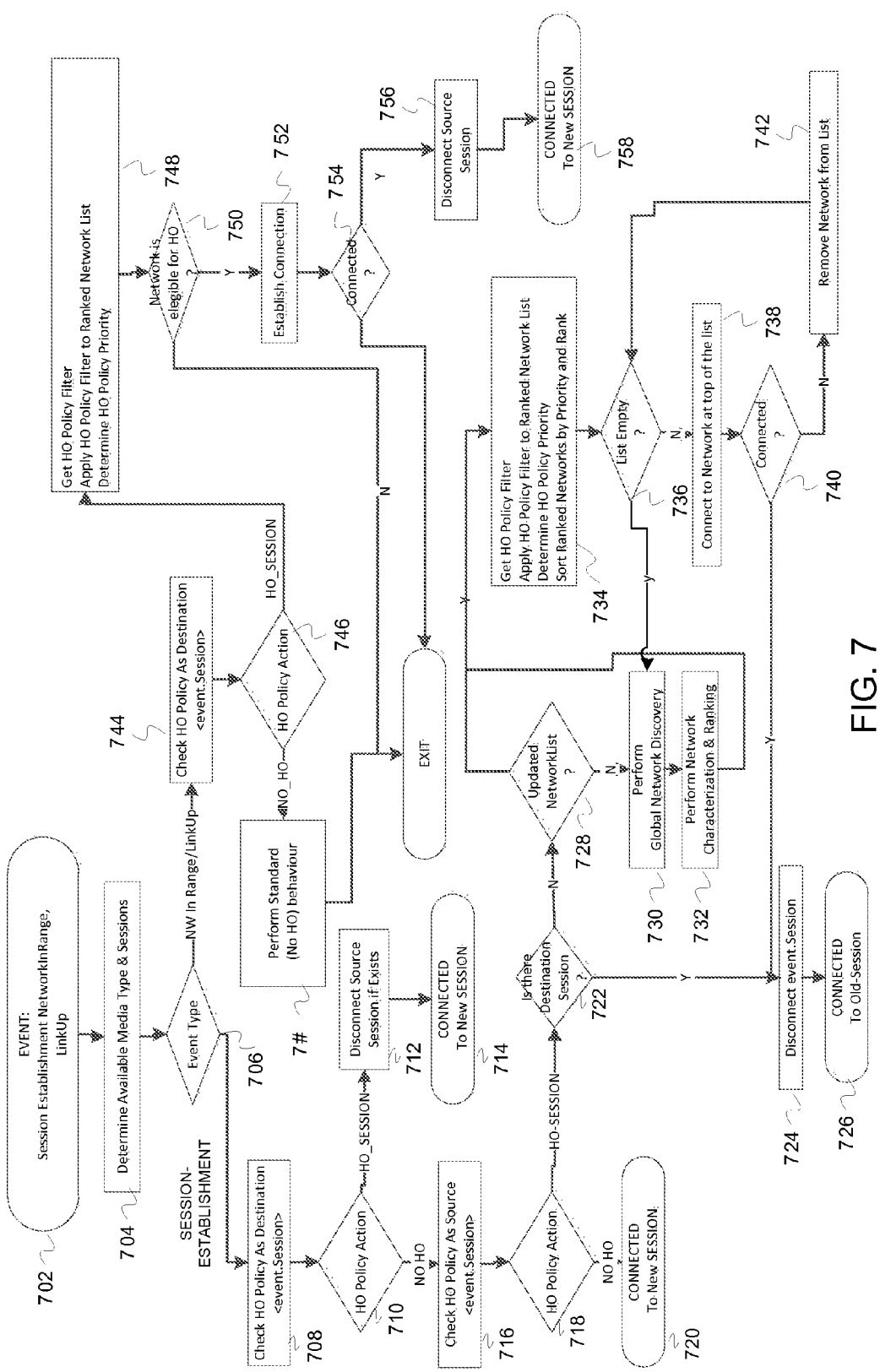
FIG. 7 describes operations for switching between networks (a.k.a session hand-off), according to some embodiments of the invention.

FIG. 7 describes operations for switching between networks (a.k.a. session hand-off), according to some embodiments of the invention. The operations of FIG. 7 refer to a hand-off policy (HO Policy). The hand-off policy uses data from the network characterization (e.g., HO-grade, HO-score, etc.) and other factors (e.g., date-time, location scope <lat,long>, Network Provider <1st, 2nd>, media type <1st, 2nd>) to determine whether the mobile device should switch from one network to another.

In FIG. 7, the flow 700 begins at 702, where the connection manager detects an event. The event can be a link-up event or a session-establishment event. At block 704, the connection manager determines the available media type (e.g., Wi-Fi) and sessions.

At block 706, the connection manager determines the event type. A session-establishment event indicates that the connection manager has connected to a new network, and can access the internet. A link-up event indicates that the connection manager has detected a new network, but has not yet connected to the new network. If the event is a session-establishment event, the flow continues at block 708. At this point, the connection manager has connected to a new network (by virtue of the session-establishment event) and is determining whether switch networks. At this point, the mobile device may be connected to the new network and a first network. At 708, the connection manager checks the hand-off policy associated with the new network (i.e., network for which the session-establishment event was received) as a destination network for the mobile device. That is, the hand-off policy indicates whether the mobile device should switch to the new network from another network. In some embodiments, the hand-off policy for a network is based on data from the network characterization, such as a network's hand-off grade, hand-off score, etc. (see fields in table the characterization table 600). The hand-off policy can indicate that there should be a handoff, or that there should be no handoff. For example, the policy may depend on a network's HO-grade and/or HO-score (e.g., stored in table 7). At block 710, the connection manager determines whether there should be a hand-off based on the hand-off policy. If the handoff policy indicates that a handoff should take place, the connection manager disconnects from the source session (712) (e.g., a first network to which the mobile device was connected before the session-establishment event) and remains connected to the new network (714). In some embodiments, for a more seamless transition between networks, the operations at block 712 and 714 can be reversed.

Referring back to block 716, the connection manager checks the hand-off policy related to the new network as a source network (716) (i.e., the policy indicating whether the mobile device should hand-off to the new network from another network—e.g., because data costs are lower on the new network). The handoff policy considering the new network as a source network can indicate that there should be a hand-off, or that there should not be a hand-off. If the policy indicates there should be no handoff, the connection manager remains connected the network for which the session-establishment event was received (720). However, if the policy indicates there should be a hand-off (at 718), the connection manager looks for another network to switch to (722). If there is another network to which the mobile device can connect (e.g., a network to which the mobile device was recently connected), the connection manager disconnects from the current network (724) and connects to the other network (726).

Referring back to block 722, at this block, the hand-off policy (for the new network as a source network) indicates that a handoff should be made from the new network to yet another network (718). Therefore, the connection manager proceeds to search for another network to which it can connect. If there is not an updated list of networks to which the connection manager can connect (728), the connection manager performs network discovery (e.g., scanning), network characterization, and network ranking (e.g., raking networks based on network characterization data, such as HO-ranks) (730 and 732).

If there is an updated network list (at block 728), the flow continues at block 734. At block 734, the connection manager gets the hand-off policy filter, which enforces hand-off policies for networks in the list. Based on the hand-off policy filter, the connection manager sorts the list networks by priority and rank. If, based on the hand-off policy, there are no networks in the list, the flow goes back to block 730. On the other hand, if there are networks in the list, the connection manager attempts to connect to the network at the top of the list (738). If the connection manager cannot connect to the network at the top of the list, the connection manager removes the network from the list (742) and continues the flow at block 736 (i.e. tries to connect to another network in the list). However, if the connection manager can connect to the network at the top of the list, it disconnects from the current network (i.e., the network for which a session-establishment session event was received) (724) and connects to another network (726).

At block 706, the connection manager processes the linkup/network-in-range event. This event indicates that a particular network is in range and available for connection. At 744, the connection manager determines a hand-off policy for the in-range network as a destination network (i.e., a hand-off policy indicating whether the mobile device should hand-off to the network associated with the in-range/linkup event). Based on the policy, connection manager determines whether or not there should be a session hand-off (746). If there should be a session hand-off, the connection manager applies the hand-off policy filter to the ranked list of networks, and determines hand-off priority (748). If the network associated with the linkup event is eligible for a hand-off (750), the connection manager attempts to connect the network (752). If the connection is successful, the connection manager disconnects from the source network (756) and establishes a new session with the destination network. Referring back to block 754, if the connection manager cannot connect to the network associated with the link-up event, the flow ends.

Figure 8:
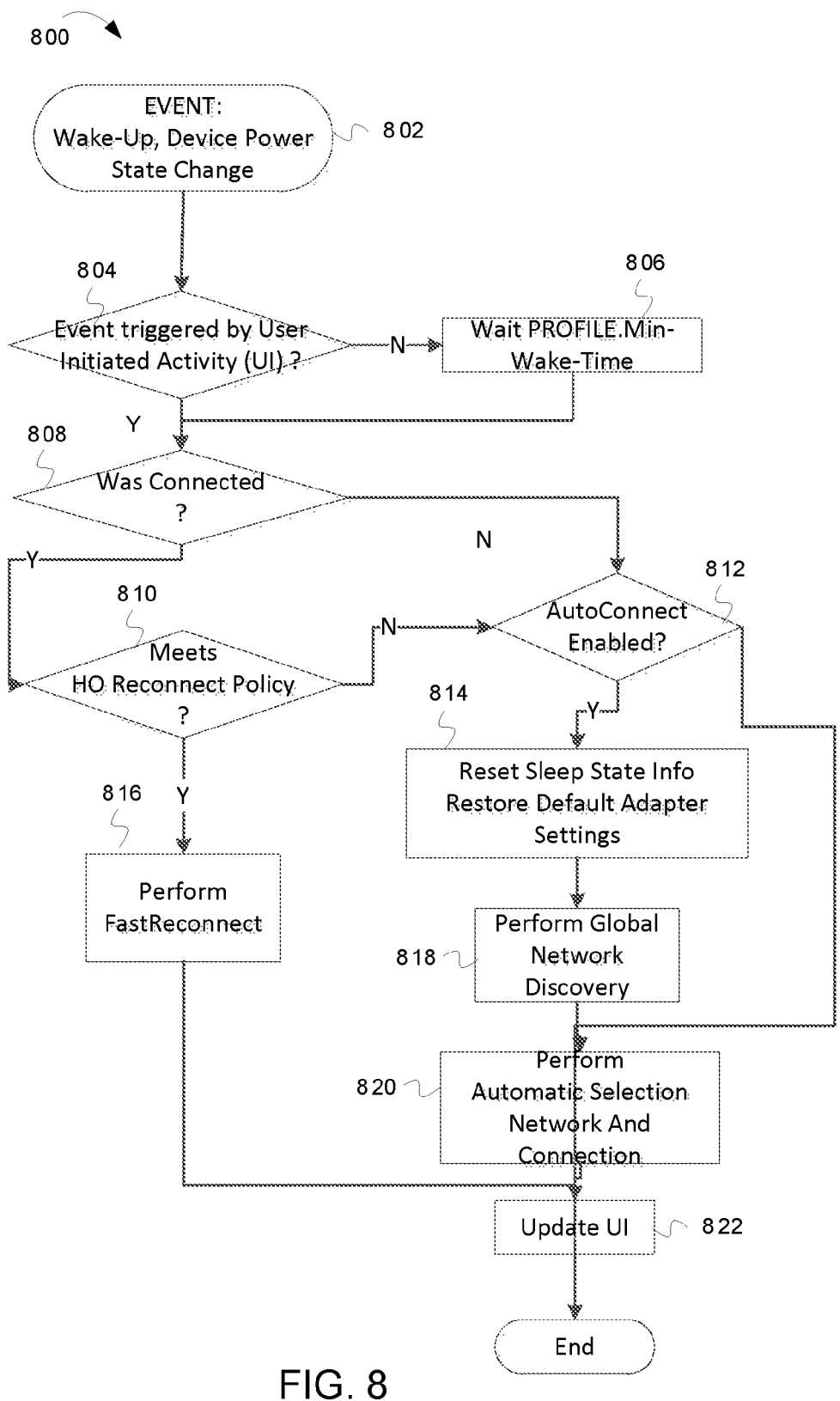
FIG. 8 is a flow diagram illustrating operations for connecting to a network, according to some embodiments of the invention.

In some embodiments, the connection manager can reestablish connections to networks to which the mobile device was recently connected. For example, a mobile device may briefly go into a low-power "sleep" state while connected to a network. After the mobile device "wakes up", if it was not disconnected for a long time, it can reconnect the same network without performing network scanning and network characterization. FIG. 8 describes some of these embodiments.

FIG. 8 is a flow diagram illustrating operations for connecting to a network, according to some embodiments of the invention. In FIG. 8, the flow 800 begins at block 802, where the connection manager detects a device-power-state-change event. If the event was triggered by user input (e.g., a user enters input to switch the mobile device into normal-power mode from low-power mode) (804), the mobile device wakes up according to profile information (806). After the mobile device wakes up, the connection manager determines whether the mobile device was recently connected to a network (808). If the device was recently connected, the connection manager determines whether the hand-off policy allows for reconnection to the network. If the hand-off policy allows for reconnection, the connection manager performs a fast reconnect (described in more detail below) (816), and updates the user interface to reflect the connection (822).

Referred to blocks 808 and 810, if the mobile device was not connected to a network or the hand-off policy does not allow a reconnection, the flow continues at block 812. At block 812, the connection manager determines whether auto-connect is enabled. If so, the connection manager restores settings of the network interface chip (814), performs global network discovery (816) (i.e., scanning for available networks), and automatically selecting connects to an available network (818). In turn, the connection manager updates user interface to indicate the connection (820).

Figure 9:
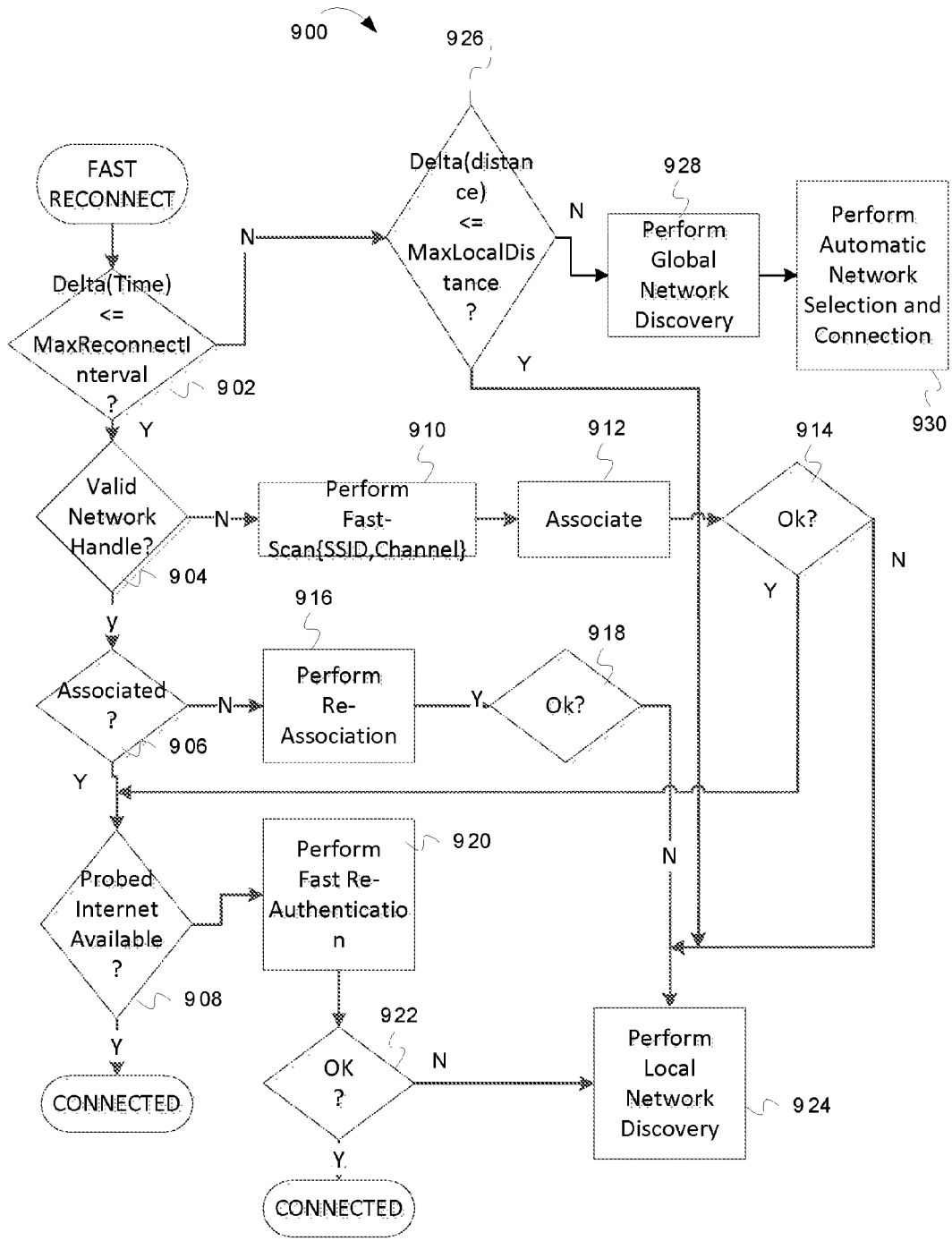
FIG. 9 is a flow diagram illustrating operations for fast connecting to networks, according to some embodiments of the inventive subject matter.

Some embodiments can "fast connect" to networks. FIG. 9 is a flow diagram illustrating operations for fast connecting to networks, according to some embodiments of the inventive subject matter. In FIG. 9, the flow 900 begins at block 902, where the connection manager determines whether the mobile device has been disconnected from a network less than a maximum reconnect interval time. If the mobile device has been disconnected from an access point for less than the maximum reconnect time, the connection manager proceeds to block 904. At 904, the connection manager determines whether it has a valid network handle for a network. If the connection manager has a valid network handle, it determines whether it is associated with an access point for the network (906). If the connection manager is associated with the access point, it probes to determine whether the internet is accessible (908). If the internet is accessible, the connection manager is connected to the access point and can access the internet. If the internet is not accessible, the connection manager attempts fast re-authentication with the network. If fast re-authentication is successful, the connection manager is connected to the internet via the access point. Otherwise, the connection manager performs local network discovery (924) (see discussion of local network discovery herein).

Referring back to 904, if the connection manager does not have a valid handle with which to associate to the access point, it performs block 910. At 910, the connection manager performs a fast-scan, scanning based on recent SSID and channel information about the network. After detecting the network, the connection manager attempts to associated to an access point for the network (912). If the connection manager successfully associated to the network, it probes for internet availability (908). If the network is available, the flow ends. Otherwise the flow continues at block 920 (see discussion above).

Referring back to 902, is within a maximum distance from the access point (926). If the mobile device is within the maximum distance, the connection manager performs local network discovery operations (924) (see operations in FIG. 11).

Figure 10:
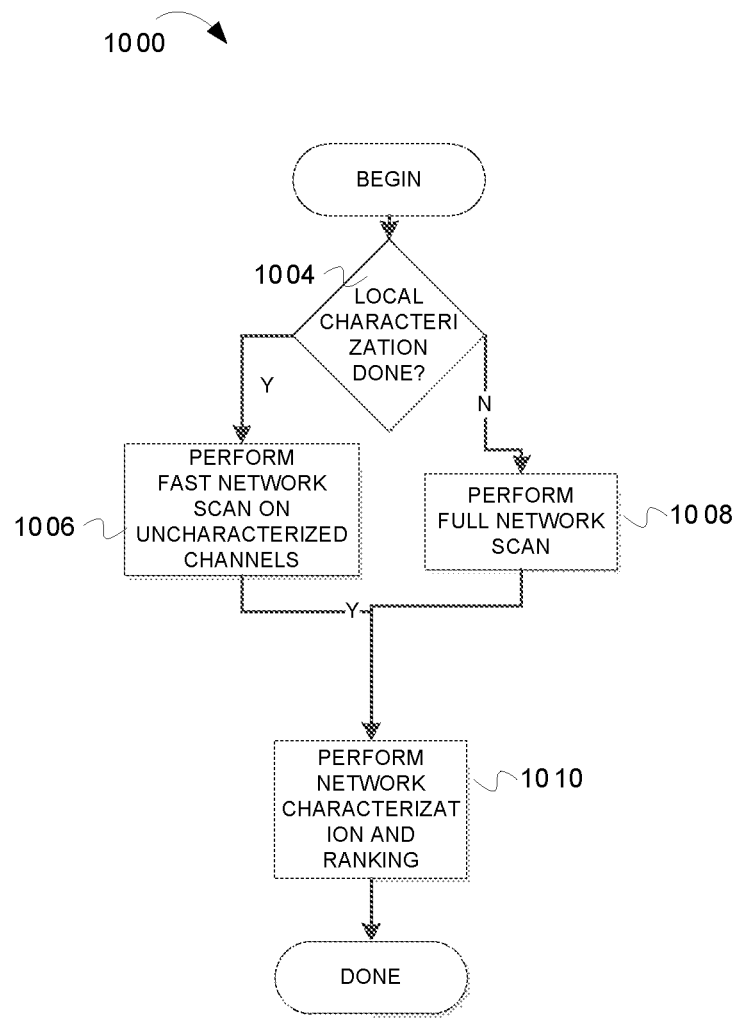
FIG. 10 describes operations for global network discovery, according to some embodiments of the inventive subject matter.

FIG. 10 describes operations for global network discovery, according to some embodiments of the inventive subject matter. In FIG. 10, the flow 1000 begins at block 1004, where the connection manager determines whether characterization of local networks has been performed. If characterization of local networks has not been performed, the connection manager performs a full network scan (1008) (see discussion of scanning above). However, if characterization of local networks has been performed, the connection manager performs a fast network scan on uncharacterized channels (1010). Both blocks 1010 at 1008 converged to block 1012, where the election manager performs network characterization and ranking based on the scanning information and network list.

Figure 11:
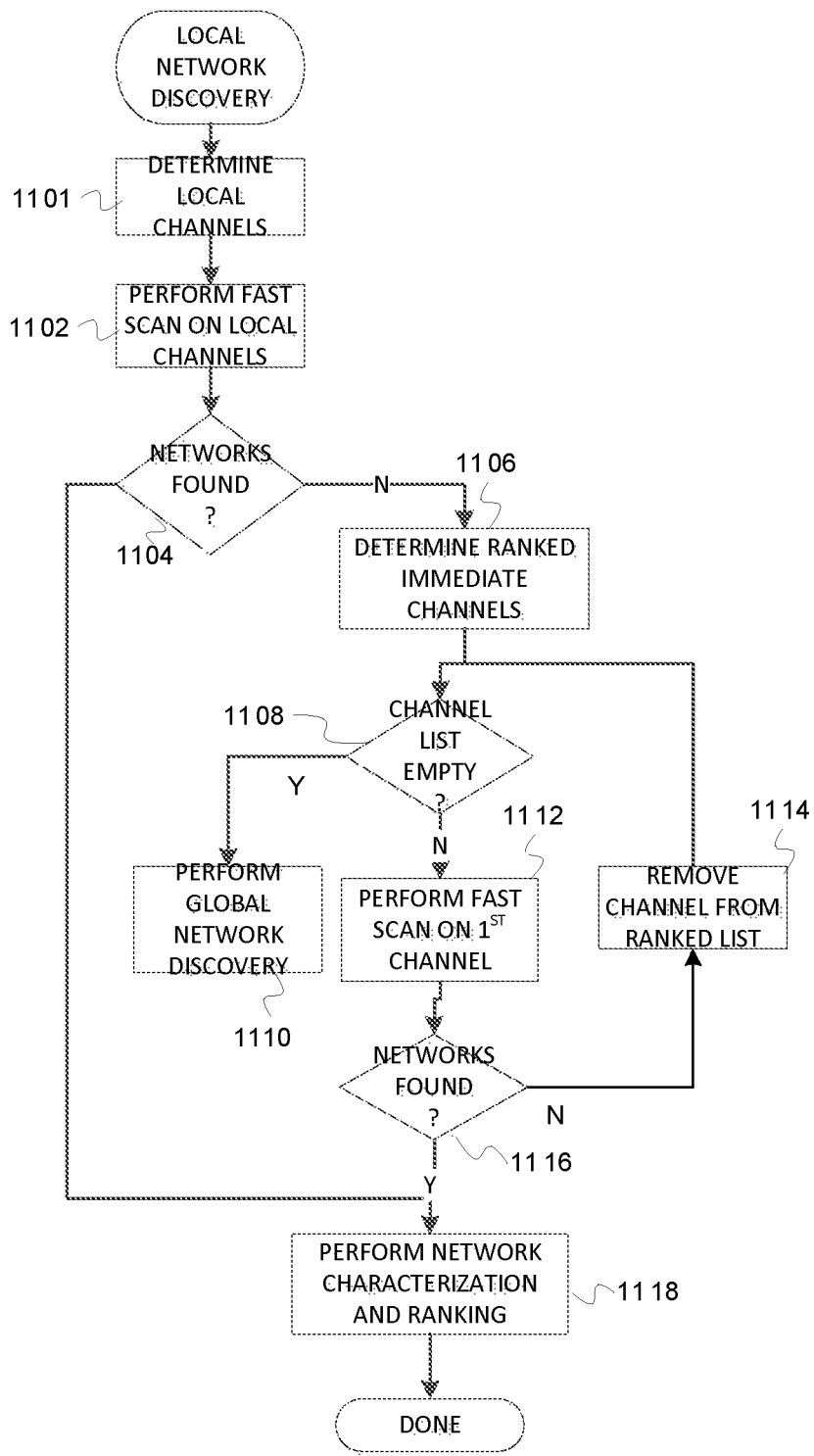
FIG. 11 is a flow diagram illustrating operations for local network discovery, according to some embodiments of the inventive subject matter.

FIG. 11 is a flow diagram illustrating operations for local network discovery, according to some embodiments of the inventive subject matter. In FIG. 11, the flow 1100 begins at block 1101, where the connection manager determines local network channels. In turn, the connection manager performs fast scan operations on the local channels (1102). After the fast scan, the connection manager determines whether networks were found during scanning (1104). If no networks were found during scanning, the connection manager ranks immediate channels (1106). Next, if the network list is empty, the connection manager performs global network discovery (1110) (see operations of FIG. 10). If the channel list is not empty, the connection manager performs a fast scan on the first channel (1112) (see operations for fast scan in FIG. 9). After performing fast scanning, the connection manager determines whether networks were found during the fast scanning operations. If no networks were discovered during fast scanning, the connection manager removes the channel from the right channel list, and proceeds back to block 1108. However, if networks were found during fast scanning, the connection manager performs network characterization ranking (1118).

Comments about Some Embodiments

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for configuring and operating network appliances as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for switching a mobile device from a first network to a second network, the method comprising:
   communicating with the mobile device via the first network;
   detecting the second network, wherein the first network is a cellular telephone network and the second network is a WiFi network;
   applying a hand-off policy filter to the second network;
   determining, based on application of the hand-off policy filter, that the mobile device should connect to the second network, wherein the hand-off policy filter includes a hand-off grade for the second network, wherein the hand-off grade is alternately unstable, short lived session expected and stable, wherein the hand-off grade is based on information received from an access point and calculations on the information indicating signal strength of the access point and distance between the access point and the mobile device, wherein the hand-off grade is a function of
      determining, based on signal data, movement of the mobile device relative to one or more access points of the second network;
      determining that one or more signals of the second network are above a dwell threshold level for reliable wireless connectivity;
      determining data transfer costs of a network connection for the first network compared to the data transfer costs of a network connection for the second network; and
   connecting, based upon the hand-off grade, the mobile device to the second network.

* * * * *